UNITED STATES PATENT OFFICE.

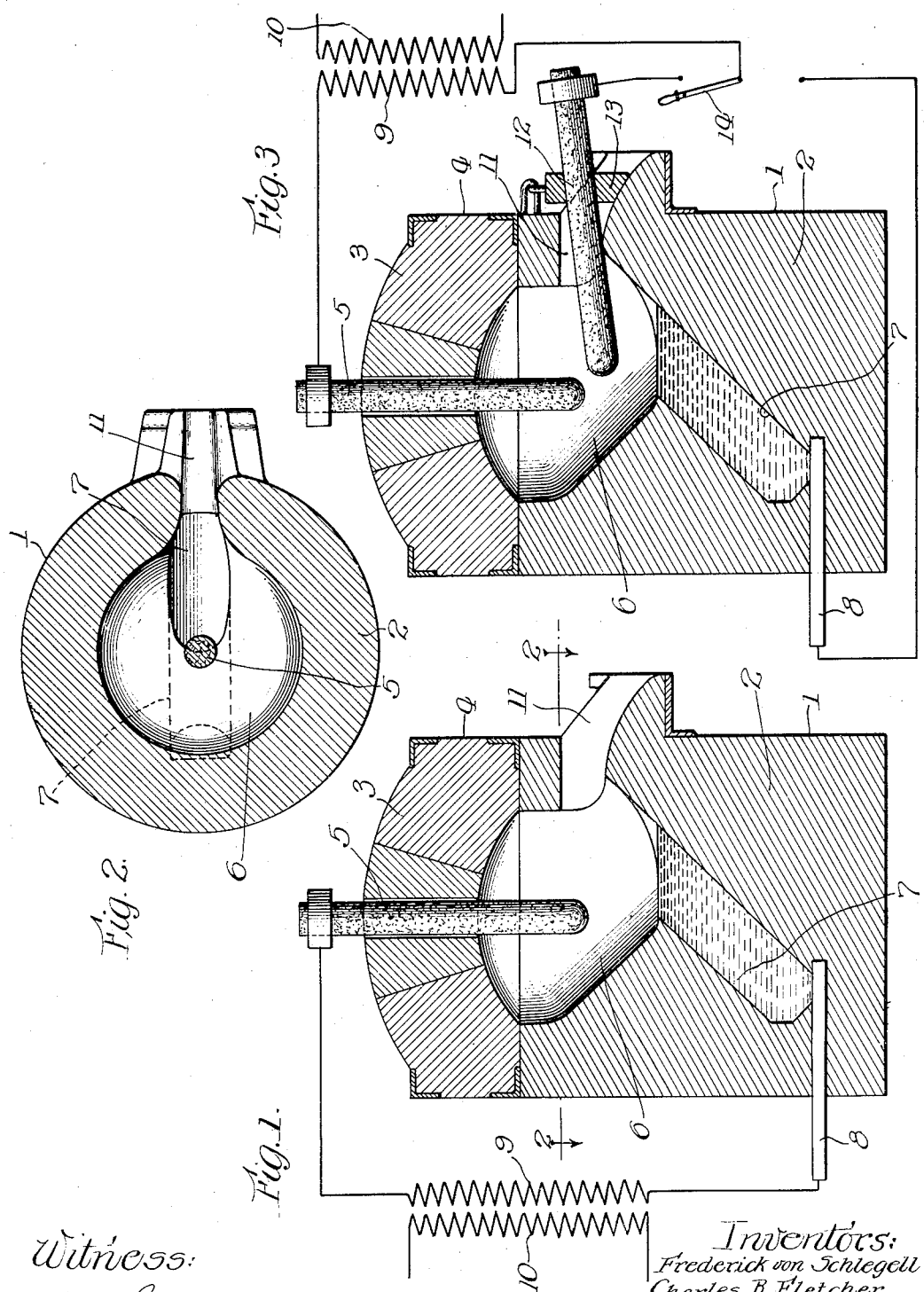

FREDERICK von SCHLEGELL, OF EVANSTON, ILLINOIS, AND CHARLES B. FLETCHER, OF INDIANAPOLIS, INDIANA.

ELECTRIC FURANCE.

1,294,837.     Specification of Letters Patent.     Patented Feb. 18, 1919.

Application filed November 25, 1918. Serial No. 263,980.

*To all whom it may concern:*

Be it known that we, FREDERICK VON SCHLEGELL, a citizen of the United States, residing at Evanston, in the county of Cook and State of Illinois, and CHARLES B. FLETCHER, a citizen of the United States, residing at Indianapolis, in the county of Marion and State of Indiana, have invented certain new and useful Improvements in Electric Furnaces, of which the following is a specification.

This invention relates to improvements in electric arc furnaces and more particularly to furnaces which are used in melting metal, which is quite volatile when in molten condition, brass being an alloy of such metals, for example.

The object of the invention is to provide a furnace in which the loss of metal, due to such volatilization, is reduced to a minimum.

A contributory object is to provide a furnace having an auxiliary chamber communicating with the main melting chamber by an opening of comparatively small cross sectional area.

A further object is to provide means whereby the charge is melted down by a direct arc and thereafter maintained in molten condition by an indirect arc.

In the accompanying drawings, I have illustrated two forms of the invention somewhat diagrammatically.

Figure 1 is a sectional elevation of one form of furnace;

Fig. 2 is a section thereof on the line 2—2 of Fig. 1;

Fig. 3 is a sectional elevation of a two-electrode furnace.

The main body of the furnace may be of any suitable design comprising preferably an outer metal housing 1 which may be made of steel plates inclosing a refractory body 2. The roof 3 is also made of suitable refractory material contained within a metal housing 4. An electrode 5 projects through an opening in the roof into the melting chamber 6.

In addition to the main chamber or melting chamber 6, an auxiliary chamber 7 is provided which is arranged preferably beneath the main chamber and has an inclined bottom. The purpose of this auxiliary chamber is to receive the molten brass or other molten metal, which is melted in the main chamber and which runs down into and collects in the bottom of the auxiliary chamber.

At the bottom of said auxiliary chamber a suitable contact member 8 is provided, through which the circuit is completed to an external source of current which may be a transformer having the usual windings 9 and 10.

The furnace is provided with a suitable spout 11 through which the molten metal may be poured. The inclined bottom of the auxiliary chamber 7 leads directly to the pouring spout whereby the molten metal may be readily poured when the furnace is tilted. The molten metal in the auxiliary chamber has a comparatively small cross section exposed to the heat of the arc, and, therefore, the volatilization of said metal is reduced to a minimum. Furthermore, the molten metal in said auxiliary chamber is kept sufficiently hot, without exposing it to the intense heat to which the contents of the main melting chamber are subjected. As the metal is poured, it flows over the upper heated portion of the inclined outlet and thereby tends to become further heated, preventing premature cooling. In the form of furnace described herein, the charge in the melting chamber is melted by the heat of a single arc, which is struck between the electrode 5 and the charge itself, the circuit to the contact 8 being completed through the charge and the molten metal which collects in the auxiliary chamber. Under certain conditions, it may be desirable, however, to maintain an arc independently of the charge. For this purpose, a supplemental electrode may be employed as shown in Fig. 3. In this figure a second electrode 12 is arranged so as to project through the pouring spout and is suitably supported by means of a holder 13. The circuit to said second electrode may be completed by means of a suitable switch 14. When this switch is opened, the circuit may be completed through the bottom contact as in the first form of device described. The second electrode may be adjusted by moving it toward or away from the first electrode. The holder therefor may be in the form of a plug or closure for the pouring spout, said holder being mounted so that it may be swung out of the way when the second electrode is withdrawn sufficiently to permit such movement. In case a special holder is not employed, the electrode may simply rest in the spout. Although only a single main electrode is employed, it will be understood that more than one main electrode may be used in conjunction with a secondary electrode, if desired. In other words, the melting down may be effected by more than one arc.

In both forms of device illustrated, the charges are melted down by a direct arc, that is, one struck between the vertical electrode and the charge. Where a second electrode is employed, as in Fig. 3, the charge after being melted down receives further heat from an arc struck between the vertical electrode and the horizontal electrode, the circuit from the horizontal electrode being completed by throwing the switch 14 to close the circuit to said electrode and open the circuit from said bottom contact. The charge is therefore melted down with what may be called a direct arc and maintained in molten condition by an indirect arc, the heat from said arc being radiated directly downwardly onto the surface of the molten bath and also radiated upwardly toward the roof and reflected back to the bath.

In both forms or device, it will be understood that suitable means are to be provided for gradually lowering and adjusting the upper electrode as it is being consumed, so as to maintain an arc of the desired length. The horizontal electrode may also be adjusted in like manner to assist in maintaining the arc.

What we claim is:

1. An electric furnace comprising a melting chamber and an auxiliary chamber so related to said main chamber as to reduce the exposed area of the molten metal to prevent excessive volatilization of said metal.

2. An electric arc furnace comprising a melting chamber and an auxiliary chamber connected thereto, said auxiliary chamber being of small cross sectional area at the point of connection.

3. An electric arc furnace comprising a melting chamber and an inclined auxiliary chamber beneath said melting chamber.

4. An electric arc furnace comprising a melting chamber, a pouring spout, and an auxiliary chamber beneath said main chamber, said auxiliary chamber having an inclined spout leading directly to said pouring spout.

5. An electric arc furnace comprising a container for the charge, an electrode projecting through the roof of said container into the melting chamber, a pouring spout for said melting chamber, an auxiliary chamber beneath said melting chamber, and a contact member communicating with the lower end of said auxiliary chamber whereby the circuit may be completed through the metal in said auxiliary chamber.

6. An electric arc furnace comprising a melting chamber, an auxiliary chamber, an adjustable electrode projecting into said melting chamber, an electrical contact in electrical communication with said melting chamber, and an additional electrode for said melting chamber.

7. An electric arc furnace comprising a melting chamber having an outlet, an electrode projecting through the roof of said melting chamber, a second electrode projecting into said melting chamber through said outlet, and an auxiliary chamber connecting with said melting chamber.

8. An electric arc furnace comprising a melting chamber having a pouring spout, an electrode projecting into said melting chamber through the wall thereof, a closure for said pouring spout, and a second electrode projecting into said melting chamber through said closure, said second electrode being adjustable relatively to said closure and the latter being removable to permit discharge of the contents without obstruction.

9. An electric arc furnace comprising a chamber, an electrode projecting into said chamber, means for completing a circuit through an arc from said electrode to the charge whereby said charge is melted by the heat of a direct arc, a supplemental electrode projecting into said chamber, and means for completing a circuit through an arc between said first electrode and said supplemental electrode whereby said charge is subsequently heated by an indirect arc.

10. The method of melting a charge which consists of forming an arc between said charge and an electrode and collecting the material melted by the heat of the arc in a chamber, permitting only a small area of molten metal to be exposed to the heat of said melting chamber.

11. The method of melting brass and like materials, which consists in liquefying the charge in a melting chamber by means of a direct arc, permitting the molten metal to collect in an auxiliary chamber and maintaining said metal in molten condition by means of an indirect arc.

12. The method of melting brass and like materials which consists in liquefying the charge in a melting chamber by means of a direct arc and maintaining said metal in molten condition by means of an indirect arc.

In testimony whereof, we have subscribed our names.

FREDERICK von SCHLEGELL.
CHARLES B. FLETCHER.